J. DUBOIS, Jr.
Carriage-Brake.
No. 89. Reissued Nov. 4, 1846.
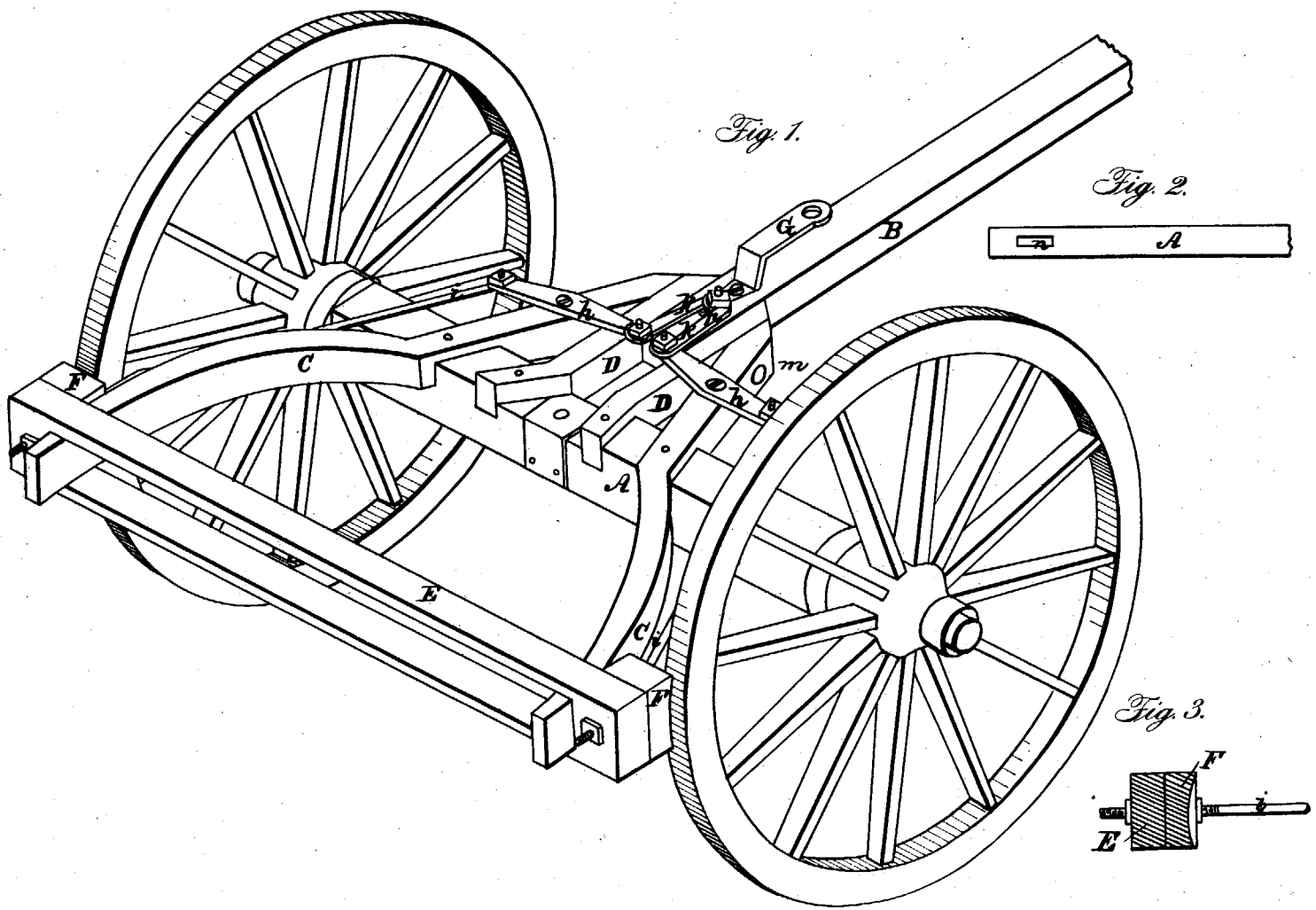
AM. PHOTO-LITHO. CO. N.Y. (OSBORNE'S PROCESS.)

UNITED STATES PATENT OFFICE.

JOHN DU BOIS, JR., OF CASCADE TOWNSHIP, LYCOMING COUNTY, PA.

IMPROVEMENT IN SELF-ACTING BRAKES FOR CARRIAGES.

Specification forming part of Letters Patent No. 4,571, dated June 13, 1846; Reissue No. 89, dated November 4, 1846.

*To all whom it may concern:*

Be it known that I, JOHN DU BOIS, Jr., of Cascade township, in the county of Lycoming and State of Pennsylvania, have invented a new and useful method of adapting and attaching self-adjusting brakes to the forward wheels of four-wheeled vehicles for the purpose of retarding their motion in descending hills; and I do hereby declare the following to be a full and exact description thereof, reference being had to the accompanying drawings, making a part of this specification.

The nature of my invention consists in the combination of a pair of long curved hounds and a pair of short parallel hounds with each other and with the axle and pole of a four-wheeled vehicle in such a manner as to stay and support the pole, and at the same time allow of its sliding freely between the short hounds; and also in extending the curved rear ends of the long hounds a sufficient distance back of the axle to enable me to secure a movable adjustable sway-bar to the same, having rubbers on each of its extended ends, the sway-bar being connected to the pole by levers, &c., in such a manner that any backward pressure against the pole will press the rubbers on the sway-bar uniformly against the rear sides of the forward wheels, the sway-bar and rubbers always acting at right angles with the pole, whether the pole be in line with the body of the vehicle or otherwise.

In the accompanying drawings, Figure 1 is a perspective elevation of a pair of wheels and axle with the section of a pole secured to the same, and also showing the manner of combining the pole with the hounds, sway-bar, and brakes. Fig. 2 is a side elevation of the rear end of the pole, and Fig. 3 is an end elevation of one of the rubbers, the sway-bar on which it is secured, and a section of one of the connecting-rods *i*, also showing the manner of securing the rubbers to the sway-bar E, and the manner of graduating the rubbers to a proper distance from the wheels by means of the screw on the end of the connecting-rod *i*, and the nuts embracing the sway-bar and rubbers.

A is the axle. B is the pole. C C are the long curved hounds, and D D are the short parallel hounds. The long hounds C C are straight for about one-third of their length, (more or less,) and are curved for the remainder of the same. They are let into and secured to the axle, their curved portions extending outward aft from the axle and their straight portions inward in front of the same at an angle of seventy or eighty degrees (more or less) with the axle. The rear ends of the short parallel hounds D D are let into and secured to the axle between the long hounds, their front ends extending forward until they reach and are joined to the front ends of the long hounds.

The pole A is secured between the short parallel hounds as follows: A bolt, *m*, passes through the front ends of the long and short hounds and through the slot *n* in the pole, thus strongly fastening the front ends of the long and short hounds to each other, and securing the pole between the short parallel hounds in such a manner as to allow it to slide backward and forward the length of the slot *n* when the pole is acted upon in either of those directions.

To the best of my knowledge and belief short parallel hounds have never before been secured to the axle of a vehicle, nor similarly combined with the long hounds, pole, and axle, which combination I consider essential to the other parts of my invention.

E is the sway-bar working on the rear ends of the curved portions of the long hounds. F F are rubbers secured to each end of the sway-bar. G is the hammer-strap, secured to the rear end of the pole. *h h* are rock-levers, their centers being secured to the long hounds by bolts. *i i* are rods connecting the outer ends of the rock-levers *h h* with the ends of the adjustable sway-bar E, passing through the rubbers, and securing them to the sway-bar by means of screws and nuts, as represented. The screws and nuts on the connecting-bars *i i* also serve for regulating and graduating the distance of the rubbers from the wheels. *k k* are connecting-bars which connect the inner ends of the rock-levers *h h* with the rear end of the pole by means of a bolt passing up through the pole, hammer-strap, and the connecting-bars.

When it is desired to prevent the rubbers from acting on the wheels in backing a vehihicle, a bolt, *p*, is inserted into a hole in the pole just in front of the draft-bolt *m*, which prevents the pole from sliding backward between the parallel hounds. In descending a hill, when the weight of the load presses the vehicle forward upon the horses, they push back upon the pole, and in so doing they draw the rubbers F F against the rear side of the periphery of the forward wheels, through the agency of the connecting-bars *k k*, rock-lévers *h h*, and connecting-rods *i i*, with a force corresponding to the weight of the load and the inclination of the hill. The adjustable sway-bar E is composed of two pieces united at their ends, or of a single piece of timber with a slot through the same of sufficient length to allow the hounds to pass through each end of the same, on which the sway-bar slides freely by the action of the pole to which it is connected, as herein set forth. The reach-pole, which connects the rear to the forward axle of a wagon, passes through the central portion of the opening in the sway-bar.

Having thus fully described the construction and operation of my self-acting brake as applied to the forward wheels of wagons or other vehicles, what I claim therein as new, and desire to secure by Letters Patent, is—

1. The placing on the rear ends of the long extended portion of the hounds C C an adjustable movable sway-bar, E, having brakes or rubbers attached to each of its extended ends in a position to act on the forward wheels of a wagon or carriage when its forward motion is retarded by the pole, the adjustable sway-bar E being connected to and operated by the pole by means of connecting-rods and levers, the whole combined and operating substantially as herein set forth.

2. The short parallel hounds D D, fastened firmly to the axle, in combination with the long hounds and the pole, substantially in the manner and for the purpose herein set forth.

JOHN DU BOIS, Jr.

Witnesses:
W. D. Haslet,
George Erety.